United States Patent Office 3,723,375
Patented Mar. 27, 1973

3,723,375
NOVEL ANHYDRIDE INTERPOLYMERS
Nathan D. Field, Allentown, and Earl P. Williams, Pen Argyl, Pa., assignors to GAF Corporation, New York, N.Y.
No Drawing. Continuation of abandoned application Ser. No. 625,585, Mar. 24, 1967. This application Nov. 24, 1970, Ser. No. 92,510
Int. Cl. C08f 15/40, 27/08
U.S. Cl. 260—29.6 TA                10 Claims

ABSTRACT OF THE DISCLOSURE

Anhydride interpolymers and their water-soluble derivatives comprising maleic anhydride and vinyl monomers of two different classes, one class being styrene, the other class being represented by the structural formula

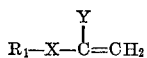

wherein $R_1$ is an organic radical containing $C_6$ to $C_{36}$ carbon atoms, Y is hydrogen, halogen, alkyl or phenyl and X is oxygen, sulphur, carboxy, carbonamido or a chemical bond; said anhydride interpolymers being very useful as thickening agents for solutions of high ionic strength.

RELATED APPLICATION

This application is a continuation of application Ser. No. 625,585, filed Mar. 24, 1967, and now abandoned.

BACKGROUND OF THE INVENTION

This invention relates to novel water-insoluble anhydride interpolymer compounds and their water-soluble derivatives as thickening agents.

We have now discovered a surprising new class of highly useful anhydride interpolymers that are derivatives of maleic anhydride and a mixture of vinyl monomers which may be used as thickening agents, especially in the form of their water-soluble derivatives, such as their salts, partial ester-salts, partial amide-salts and the like.

The instant novel compounds have been found to be very useful in thickening solutions of high ionic strength, including concentrated salt solutions as well as bases and acids where most conventional water-soluble polymers have little effect or are insoluble. For example, the instant interpolymers may be useful in thickening 15% diammonium phosphate solution, which is used in firefighting and 20% tetrapotassium pyrophosphate which is used in detergent compositions and 5% sodium bromate which is used in permanent wave formulations. Moreover, the instant interpolymers are very effective for thickening concentrated ammonia as well as for thickening other strong alkali solutions such as sodium hydroxide, sodium carbonate, tetrapotassium pyrophosphate and sodium silicate. The thickened ammonia solutions are useful as agricultural fertilizers and the thickened strongly alkaline solutions are useful as heavy duty cleaners, paint removers, oven cleaners, etc. Moreover, the instant compounds may be used thicken water and rubber latices as well as non-aqueous solutions or mixtures of non-aqueous and aqueous solutions such as glycerine, ethylene glycol, alcohols, methyl ethyl ketone, acetone, dimethyl formamide, dioxane as well as water solutions of the above. The instant compounds are also useful as gelling agents in cosmetic formulations such as shampoos, hand lotions, shaving creams, etc. The above solutions and dispersions have good stability upon storage, in fact some of them have even exhibited increased viscosity values upon storage.

SUMMARY OF THE INVENTION

The primary object of this invention is to provide novel anhydride interpolymer compounds and their water soluble derivatives comprising maleic anhydride and vinyl monomers of two different classes. One class of vinyl monomer may be represented by the structural formula

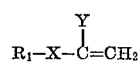

wherein $R_1$ represents an organic radical containing $C_6$ to $C_{36}$ carbon atoms, Y represents hydrogen, halogen (chlorine, bromine, iodine and fluorine), lower alkyl or phenyl and X represents oxygen, sulphur, carboxy, carbonamido or a chemical bond. The other vinyl monomer is a vinyl compound represented by the structural formula $R\text{---}CH\text{=}CH_2$, wherein R represents a phenyl radical e.g., styrene.

More specifically, the novel interpolymer compounds coming within the purview of this invention are those polymers having the following structural units:

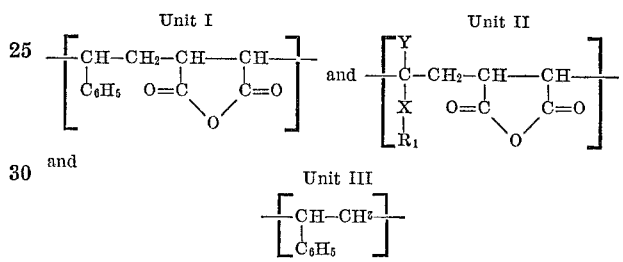

wherein structural Unit I plus structural Unit III represents a total of about 75–99.5 mole-percent (preferably a total of 85–99 mole-percent) and structural Unit II represents about 25 to 0.5 mole-percent (preferably about 1 to 15 mole-percent) and structural Unit III represents 0 to about 30 mole-percent of the interpolymer; wherein Y represents a radical selected from the group consisting of hydrogen, halogen (chlorine, bromine, iodine and fluorine), lower alkyl and phenyl; wherein X represents a radical selected from the group consisting of oxygen, sulphur, carboxy, carbonamido and a simple chemical bond; wherein $R_1$ represents the same or different hydrocarbon radical containing $C_6$ to $C_{36}$ carbon atoms (preferably $C_6$ to $C_{20}$) selected from the group consisting of normal chain alkyl, branched chain alkyl, cycloalkyl and alkylaryl radicals (preferably alkyl); and the water soluble derivatives of said interpolymer compounds such as their salts, partial ester-salts, partial amide-salts, and the like.

The molecular weight of the insoluble anhydride interpolymers of this invention may conveniently be defined by their specific viscosity in a number of solvents. The instant polymers encompassed by this invention are those polymers in which 1.00 g. of the polymer per 100 ml. of methyl ethyl ketone solution give a specific viscosity at 25° C. in the range of from 0.1–25, while those polymers giving a viscosity range of 0.2–20 are preferred.

DESCRIPTION OF THE PREFERRED EMBODIMENTS

These novel compounds may be prepared by conventional known methods, for example, by interpolymerizing maleic anhydride and a mixture of vinyl monomers using approximately one mole of maleic anhydride per mole of vinyl monomer mixture. A small molar excess of the vinyl monomer mixture (5 to 10%) above that of the maleic anhydride may be advantageous for insuring complete conversion of the maleic anhydride. The ratio of the styrene vinyl monomer to the

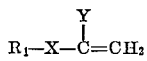

vinyl monomer comprising the total amount of such vinyl monomer mixtures should fall within the ranges set forth above, i.e., from about 75 to 99.5 mole-percent of the $C_6H_5$—CH=$CH_2$ vinyl monomer and from about 0.5 to 25 mole-percent of the

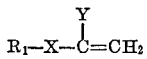

vinyl monomer. The polymerization is carried out conveniently by preparing a solvent solution of the monomers and adding a catalytic amount, (preferably from 0.01 to 1.0%), of an organic free-radical-generating initiator. Then the resulting solution is mixed thoroughly and heated sufficiently so that the polymerization reaction takes place. At the completion of the polymerization reaction the precipitated interpolymer is isolated by any suitable means, such as by filtration, washed with fresh solvent and vacuum dried. Moreover, the polymerization may also be conducted by adding a solution of the vinyl monomers to a solution of initiator, maleic anhydride and solvent.

The amount of solvent is not critical, of course the solvent chosen should be a suitable medium for all three different monomers. Such solvents as benzene, toluene, xylene, acetone, cyclohexane saturated petroleum products, methyl ethyl ketone and methylene chloride, and the like as well as mixtures thereof may be used. However, benzene and toluene are considered the most suitable from the standpoint of product isolation and obtaining high molecular weights.

Among the organic free-radical-generating initiators that may be mentioned are azobisisobutyronitrile, benzoyl peroxide, lauroyl peroxide, caprylyl peroxide, acetyl peroxide, butyryl peroxide, acetyl benzoyl peroxide, succinyl peroxide, ascaridole, di-tert-butyl peroxide or dimethyl azoisobutyrate and the like. Mixtures of such catalysts are also suitable in the process of making the interpolymers of the invention. Radiation polymerization can be used, too, e.g., such high energy radiation sources as ultraviolet light, X-rays, γ-rays, neutrons and the like can be used to initiate polymerization.

The polymerization may be carried out at a temperature within the range of 0 to 150° C., preferred temperatures lie for the most part in the range from 40 to 100° C., particularly about 50–80° C. when R represents a phenyl radical and preferably in the range of about 40 to 150° C. when R represents hydrogen or a lower alkyl radical.

Examples of the various vinyl monomers represented by

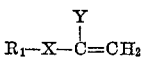

above, that may be mentioned are hexyl vinyl ether
heptyl vinyl ether
octyl vinyl ether
nonyl vinyl ether
decyl vinyl ether
hendecyl vinyl ether
dodecyl vinyl ether
tetradecyl vinyl ether
hexadecyl vinyl ether
octadecyl vinyl ether
myricyl vinyl ether
docosyl vinyl ether
cetyl vinyl ether
2-ethyl-1-butyl vinyl ether
2,6-dimethyl-4-heptyl vinyl ether
2,4,6,8-tetramethyl-1-nonyl vinyl ether
2-ethyl-1-decyl vinyl ether
2,5-diethyl-3,7-dimethyl-1-octyl vinyl ether
isooctyl vinyl ether
2-ethylhexyl vinyl ether
isodecyl vinyl ether
tridecyl vinyl ether
cyclohexyl vinyl ether
decahydronaphthyl vinyl ether
hydroabietinyl vinyl ether
terpinylvinyl ether
benzyl vinyl ether
β-phenylethyl vinyl ether
hydrocinnamyl vinyl ether
undecyl acrylate
lauryl acrylate
tridecyl acrylate
cetyl acrylate
octadecyl acrylate
myricyl acrylate
decyl methacrylate
dodecyl methacrylate
cetyl methacrylate
octadecyl methacrylate
decyl α-ethylacrylate
dodecyl α-ethylacrylate
tetradecyl α-ethylacrylate
hexadecyl α-ethylacrylate
dodecyl α-chloroacrylate
tetradecyl α-chloroacrylate
octadecyl α-chloroacrylate
octadecyl α-bromoacrylate
hexyl α-phenylacrylate
octyl α-phenylacrylate
nonyl α-phenylacrylate
decyl α-phenylacrylate
dodecyl α-phenylacrylate
decene-1
dodecene-1
hexadecene-1
octadecene-1
eicosene-1
vinyl laurate
vinyl palmitate
vinyl oleate
vinyl stearate
N-hexyl acrylamide
N-cetyl acrylamide
N-octadecyl acrylamide
N,N-dioctadecyl acrylamide
N-decyl methacrylamide
N,N-dioctyl methacrylamide
vinyl hexyl sulfide
vinyl dodecyl sulfide
vinyl tetradecyl sulfide
vinyl hexadecyl sulfide
vinyl octadecyl sulfide
N-vinyl-N-methyllauramide
N-vinyl-N-ethylmyristamide
N-vinyl-N-methylpalmitamide
N-vinyl-N-methylstearamide
N-vinyl-N-methyloleamide
tetradecyl isopropenyl ether
hexadecyl isopropenyl ether
octadecyl isopropenyl ether
myricyl isopropenyl ether and the like, as well as mixtures thereof. The preferred vinyl monomers are those where the $R_1$ radical represents a substantially linear (long chain) alkyl moiety.

The aforesaid water-soluble derivatives of the novel insoluble anhydride interpolymers of this invention, which have been converted by hydrolysis, neutralization, esterification, etc., to compounds, have the following structural units:

Unit I

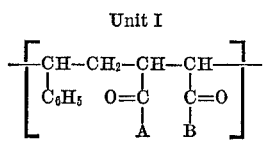

Unit II

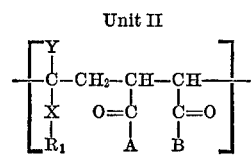

and

Unit III

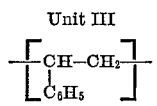

wherein $R_1$, X and Y and the mole percentages of Unit I, Unit II and Unit III have the same meanings as described above and wherein A and B each independently represent a member selected from the group consisting of —OH, —OM, —$NH_2$,

alkoxy, and aryloxy, where $Z_1$ and $Z_2$ are selected from the group consisting of hydrogen, alkyl, aryl or taken together form a heterocyclic ring, and wherein M represents a salt forming cation selected from the group consisting of alkali metals, ammonium and substituted ammonium, such as K, Na, $NH_4$, methylammonium, diethanolammonium, piperidinium, morpholinium, triethanolammonium and the like.

The above water-soluble interpolymers include those ammoniated products involving partial as well as complete conversion of the anhydride moiety such as those compounds containing the ammonium salt-half amide moiety which may be depicted as:

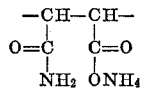

These water-soluble interpolymers may be easily derived from the above described anhydride interpolymers by forming derivatives of the anhydride portion of the polymer by the known hydrolyzing reaction thereof with water, and/or reactions involving primary and secondary alcohols, primary and secondary amines or alkali basic media to form salts, partial ester-salts, or partial amide-salts and the like.

Among the more preferred reactants that may be mentioned are water, ammonia, alkali solutions, such as sodium hydroxide, potassium hydroxide or ammonium hydroxide, etc.; methylamine, piperidine, morpholine, diethanolamine, triethanolamine, etc.; alcohols, such as methanol, ethanol, propanol, and the like; phenols, naphthols, etc.

Another object of this invention is to provide novel interpolymers particularly useful in thickened aqueous systems, i.e., in a composition of matter comprising an aqueous system having therein a thickening amount of the water soluble derivatives of the instant anhydride interpolymers, defined above. Such systems include, for example, water itself, aqueous-alkaline mixtures, aqueous-alcohol mixtures, aqueous-acid systems, polymer latices, and the like. Examples of the aqueous ionic salt acid or alkali systems which can be thickened in accordance with the present invention include solutions of diammonium phosphate, tetrapotassium pyrophoshate, ammonium hydroxide, sodium hydroxide, sodium bromate, hydrochloric acid, and the like.

The amount of water present in the above mentioned aqueous systems is in no way critical, as the thickeners employed can be utilized to thicken compositions wherein water is present in only a minor amount to an aqueous system, per se. The amount of water present in the aqueous system, therefore, is merely dependent on the use for which the thickened system is intended. In general, however, it is preferred to utilize about 1 to 60% aqueous ionic solution.

Furthermore, the amount of thickener to be employed in the aqueous compositions will vary according to the desired result, the system employed, and as a practical matter, the general economic considerations. In general, however, a range of from about 0.1% to about 15% by weight of the total aqueous composition is employed, although greater or lesser amounts can be advantageously employed when desired.

The use of the instant thickeners in the above aqueous systems is indeed unique. For example, in many ionic solutions using standard thickeners the viscosity decreases as the ionic content increases. Hence, it was unexpected that the viscosity increased with ionic content when using the novel subject thickeners.

The following examples are illustrative of the present invention and are not to be regarded as limitative. It is to be understood that all parts, percentages and proportions referred to herein and in the appended claims are by weight unless otherwise indicated. The viscosities listed in the following examples were obtained with a Brookfield RVT model rotation viscometer and the value expressed in centipoises.

EXAMPLE I

The following solution was prepared: 49.0 g. (0.50 mole) of maleic anhydride were dissolved in 350.0 ml. of benzene and filtered into a 500 ml. volumetric flask to remove maleic acid. Then 51.0 g. (0.49 mole) of styrene (Sinclair-Koppers 10–15 p.p.m.) and 2.8 g. (0.01 mole) of a vinyl ether of Alfol 1618c (a mixture of approximately ⅓ n-octadecanol and ⅔ n-hexadecanol). The volume was increased to 500 ml. with benzene at room temperature (about 23° C.) and labeled Solution B.

A control solution was similarly prepared using 49.0 g. (0.50 mole) of maleic anhydride and 52.1 g. (0.50 mole) of styrene (Sinclair-Koppers 10–15 p.p.m.) and the volume increased to 500 ml. with benzene and labeled Solution A.

Several Pyrex polymerization tubes were charged as follows holding the solutions at room temperature and varying the amount of azobisisobutyronitrile catalyst:

| Tube | Polymer | | | | |
| --- | --- | --- | --- | --- | --- |
| | 1 | 2 | 3 | 4 | 5 |
| Solution A, ml | 150 | 150 | | | |
| Solution B, ml | | | 150 | 150 | 150 |
| Grams azobisisobutyronitrile | 0.015 | 0.29 | 0.15 | 0.29 | 0.44 |

The tubes were cooled to −75° C., evacuated to 25 mm. and repressured with nitrogen. After repeating this procedure two more times and re-evacuating to 25 mm., the tubes were shaken and placed in an oven at 65° C. constant temperature for 21 hours and the interpolymers precipitated as a thick mush. The contents of each tube were slurried with 100 ml. benzene, filtered and washed three times with benzene. After drying in a vacuum oven to constant weight, the specific viscosities (1.00 gram per 100 ml. of methyl ethyl ketone solution) were determined at 25° C. and yields based on isolated product were calculated.

The results of the above determinations were as follows:

| Tube | Specific viscosity | Percent yield |
| --- | --- | --- |
| Polymer No.: | | |
| 1(Control) | 2.003 | 99.3 |
| 2 (Control) | 1.532 | 99.3 |
| 3 | 2.292 | 98.3 |
| 4 | 2.105 | 99.3 |
| 5 | 1.734 | 99.0 |

Other interpolymers may be prepared with similar results by employing other vinyl monomers, such as octadecylmethacrylate, hexadecene-1, vinyl stearate, cetylacrylamide, vinyl dodecyl sulfide, lauryl α-phenylacrylate, N-vinyl-N-methylmyristamide, stearyl α-chloroacrylate, and the like, in place of the vinyl ether of Alfol 1618c used above.

EXAMPLE II

A solution of:

|  | G. |
| --- | --- |
| Interpolymer #3 (specific viscosity 2.292) of Example I | 5.0 |
| Distilled water | 44.9 |
| 29.9% $NH_3$ | 50.1 | was prepared and mixed well. This polymer solution exhibited a Brookfield viscosity of 6080 cps. at 25° C. using a No. 7 spindle and 10 r.p.m. A control solution using the styrene-maleic anhydride copolymer (specific viscosity of 2.033) of Example I showed a Brookfield viscosity of 700 cps.

EXAMPLE III

Preparation of ammonium salt-half amides of the above polymers in Example I, was as follows:

A 5.00 g. portion of a given polymer from Example I plus 100 ml. of benzene were placed in a 250 ml. reaction flask equipped with stirrer, gas inlet tube, and reflux condenser. The polymer benzene slurry was stirred as $NH_3$ gas was induced slowly over a 1 hour period. No external cooling was used, the internal temperature rose from about 21° C. to a maximum of about 32° C. The resulting slurry was filtered and the ammonimum salt-half amide polymer products were recovered by drying in a 45° C. vacuum oven for 6 days.

EXAMPLE IV

An interpolymer ammonium salt-half amide of 50 mole-percent maleic anhydride; 47.5 mole-percent of styrene and 2.5 mole-percent of N-decyl vinyl ether was prepared according to the procedures described in Examples I and III above. This interpolymer at 1% concentration in a 15% diammonium phosphate solution produces a substantially thicker solution than one formed from a control solution having no long chain vinyl ether in the polymer.

EXAMPLE V

A solution of

|  | G. |
| --- | --- |
| Interpolymer #3 (specific viscosity 2.292) of Example I | 2.0 |
| Diammonium phosphate | 2.5 |
| Distilled water | 45.5 | was prepared and mixed well. This polymer solution exhibited a Brookfield viscosity of 224,000 cps. at 25° C. using a No. 7 spindle and 10 r.p.m. A control solution using the styrene-maleic anhydride copolymer (specific viscosity of 2.033) of Example I showed a Brookfield viscosity of 280 cps. using a No. 5 spindle and 10 r.p.m.

EXAMPLE VI

A solution of

|  | G. |
| --- | --- |
| Interpolymer #3 (specific viscosity 2.292) of Example I | 2.0 |
| Tetrapotassium pyrophosphate | 2.5 |
| Distilled water | 45.5 | was prepared and mixed well and warmed for 20 minutes in a steam bath. This polymer solution exhibited a Brookfield viscosity after 7 days of 40,000 cps. at 25° C. using a No. 7 spindle and 10 r.p.m. A control solution using the styrene-maleic anhydride copolymer (specific viscosity 2.033) of Example I showed a Brookfield viscosity of 1100 cps. at 25° C. after 7 days using a No. 6 spindle and 10 r.p.m.

EXAMPLE VII

A solution of

|  | G. |
| --- | --- |
| Interpolymer #3 (specific viscosity 2.292) of Example I | 2.0 |
| $Na_2SiO_3$ | 2.5 |
| Distilled water | 45.5 | was prepared and mixed well. This polymer solution exhibited a Brookfield viscosity of 3400 cps. at 25° C. using a No. 6 spindle and 10 r.p.m. A control solution using the styrene-maleic anhydride copolymer (specific viscosity 2.033) of Example I showed a Brookfield viscosity of 245 cps. at 25° C. using a No. 3 spindle and 10 r.p.m.

EXAMPLE VIII

A series of interpolymers of 50 mole-percent maleic anhydride, containing varying mole ratios of styrene to a vinyl ether of Alfol 1618c (a mixture of approximately ⅓ n-octadecanol and ⅔ n-hexadecanol) was prepared according to Example I. The interpolymers contain mole ratios of styrene to the above vinyl ether of Alfol 1618c in the order of (A) 49.5 mole-percent to 0.5 mole-percent, (B) 47.5 mole-percent to 2.5 mole-percent, (C) 46.5 mole-percent to 3.5 mole-percent, (D) 45 mole-percent to 5 mole-percent and (E) 35 mole-percent to 15 mole-percent. These interpolymers produce substantially thicker salt solutions than those formed from their corresponding control solutions having no long chain vinyl monomer in the polymer

EXAMPLE IX

A solution of

|  | G. |
| --- | --- |
| Interpolymer #5 (specific viscosity 1.734) of Example I | 2.0 |
| NaCl | 2.5 |
| Distilled water | 45.5 |
| NaOH | 0.7 | was prepared and mixed well. This polymer solution exhibited a Brookfield viscosity of 9400 cps. at 25° C. using a No. 6 spindle and 10 r.p.m. A control solution using the styrene-maleic anhydride copolymer (specific viscosity of 1.532) of Example I showed a Brookfield viscosity of 90 cps. at 25° C. using a No. 4 spindle and 10 r.p.m.

EXAMPLE X

A solution of

|  | G. |
| --- | --- |
| Interpolymer #5 (specific viscosity 1.734) of Example I | 2.0 |
| $Na_2SO_4$ | 2.5 |
| Distilled water | 45.5 |
| NaOH | 0.7 | was prepared and mixed well. This polymer solution exhibited a Brookfield viscosity of 5000 cps. at 25° C. using a No. 6 spindle and 10 r.p.m. A control solution using the styrene-maleic anhydride copolymer (specific viscosity of 1.532 of Example I showed a Brookfield viscosity of 300 cps. at 25° C. using a No. 3 spindle and 10 r.p.m.

EXAMPLE XI

The following table further illustrates the interpolymers included within the scope of our invention together with the molar ratios of the monomers present in the polymer. The interpolymers indicated below may be prepared by polymerizing the various momomers according to the procedure taught in Example I.

| Monomer A | Monomer B | Monomer C | Mole ratio of Monomers A:B:C |
|---|---|---|---|
| Maleic anhydride | Styrene | Alfol 1618c | 50:40:10 |
| Do | do | n-Hexadecyl vinyl ether | 50:48:2 |
| Do | do | Dodecyl vinyl ether | 50:49:1 |
| Do | do | Mixture of $C_{10}$ and $C_{14}$ alkyl vinyl ether. | 50:47.5:2.5 |
| Do | do | 2-ethyl-1-decyl vinyl ether. | 50:49:1 |
| Do | do | Cyclohexyl vinyl ether | 50:49:1 |
| Do | do | Dodecyl methacrylate | 50:44:6 |
| Do | do | Nonyl α-phenyl acrylate | 50:49:1 |
| Do | do | Decene-1 | 50:46.5:3.5 |
| Do | do | Hexadecene-1 | 50:48:2 |
| Do | do | Vinyl stearate | 50:46:4 |
| Do | do | do | 40:59:1 |
| Do | do | N,N-dioctyl methacrylamide. | 50:49:1 |
| Do | do | N-vinyl-N-methyl stearamide. | 50:48:2 |
| Do | do | N-vinyl-N-methyl oleamide. | 50:49:1 |
| Do | do | Hexadecyisopropenyl ether. | 50:47.5:2.5 |

While not all the interpolymers of our invention have been specifically described, the manner of preparing any of the compounds is believed to be obvious from the numerous examples given hereinbefore.

Various modifications and variations of this invention will be obvious to a worker skilled in the art and it is understood that such modifications and variations are to be included within the purview of this application and the spirit and scope of the appended claims.

We claim:

1. An anhydride interpolymer consisting essentially of the structural units:

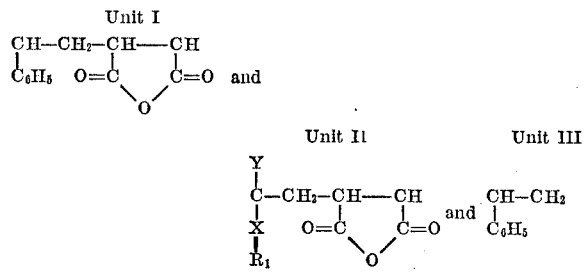

wherein Y represents a radical selected from the group consisting of hydrogen, halogen, lower alkyl and phenyl; wherein X represents a radical selected from the group consisting of oxygen, sulphur, carboxy, carbonamido and a simple chemical bond; wherein $R_1$ represents the same or different hydrocarbon radical containing $C_6$ to $C_{36}$ carbon atoms selected from the group consisting of alkyl, cycloalkyl and alkylaryl radicals; said interpolymer being insoluble in water and having a specific viscosity at 1% weight per volume in methyl ethyl ketone at 25° C. in the range of about 0.1 to 25.

2. An anhydride interpolymer, according to claim 1, wherein $R_1$ represents a hydrocarbon radical having from $C_6$ to $C_{20}$ carbon atoms.

3. An anhydride interpolymer, according to claim 1, wherein structural Unit I plus structural Unit III represent about 75 to 99.5 mole-percent, structural Unit II is about 25 to 0.5 mole-percent, and structural Unit III is about 0 to 30% of the interpolymer.

4. An anhydride interpolymer, according to claim 1, wherein structural Unit I plus structural Unit III represents about 85 to 99 mole-percent, structural Unit II is about 15 to 1.0 mole-percent and structural unit III is about 30% of the interpolymer.

5. An anhydride interpolymer, according to claim 1, wherein said polymer has a specific viscosity at 25° C. in the range 0.2 to 20.

6. An anhydride interpolymer, according to claim 1, wherein $R_1$ is an alkyl radical having from $C_6$ to $C_{20}$ carbon atoms.

7. A water-soluble interpolymer consisting essentially of the structural units:

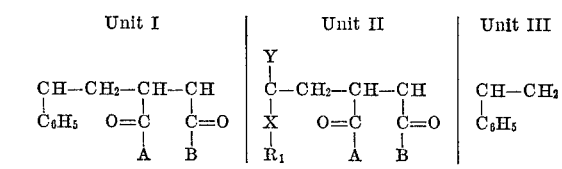

wherein Y represents a radical selected from the group consisting of hydrogen, halogen, lower alkyl and phenyl; wherein X represents a radical selected from the group consisting of oxygen, sulphur, carboxy, carbonamido and a simple chemical bond; wherein $R_1$ represents the same or different hydrocarbon radical containing $C_6$ to $C_{36}$ carbon atoms selected from the group consisting of alkyl, cycloalkyl and alkylaryl radicals; wherein A and B each independently represent a radical selected from the group consisting of hydroxy, amino, alkoxy, aryloxy and —OM, wherein M represents a salt-forming cation, the total of Unit I and Unit III comprising about 75 to 99.5 mole-percent of the interpolymer and Unit II comprising about 0.5 to about 25 mole-percent of the interpolymer, and Unit III comprising about 0 to 30 mole-percent of the interpolymer.

8. A water-soluble interpolymer, according to claim 7, wherein $R_1$ represents a hydrocarbon radical having from $C_6$ to $C_{20}$ carbon atoms.

9. A water-soluble interpolymer, according to claim 7, wherein A and B each independently represent —$NH_2$ and —$ONH_4$.

10. A thickened solution of an electrolyte comprising an electrolyte dissolved in a medium containing water and from 0.1 to about 15% by weight of said thickened solution of a water-soluble interpolymer according to claim 7.

References Cited

UNITED STATES PATENTS

| 3,085,986 | 4/1963 | Muskat | 260—31.8 |
| 3,180,843 | 4/1965 | Dickerson | 260—30.6 |
| 3,436,378 | 4/1969 | Azorlosa et al. | 260—78.5 |
| 3,002,940 | 10/1961 | Holloway | 260—17.4 |

JAMES A. SEIDLECK, Primary Examiner

J. KIGHT III, Assistant Examiner

U.S. Cl. X.R.

71—85; 260—29.6 T, 29.6 AT, 78.5 R, 78.5 T; 424—70, 73